(12) United States Patent
Katzman et al.

(10) Patent No.: US 12,269,228 B2
(45) Date of Patent: Apr. 8, 2025

(54) METHOD FOR MANUFACTURING AN OPTICAL ELEMENT WITH A FUNCTIONAL FILM

(71) Applicants: Essilor International, Charenton-le-Pont (FR); SHAMIR OPTICAL INDUSTRY LTD, Kibbutz Shamir (IL)

(72) Inventors: Youval Katzman, Kibbutz Shamir (IL); Michel Matz, Charenton-le-Pont (FR)

(73) Assignees: Essilor International, Charenton-le-Pont (FR); Shamir Optical Industry Ltd, Kibbutz Shamir (IL)

( * ) Notice: Subject to any disclaimer, the term of this patent is extended or adjusted under 35 U.S.C. 154(b) by 377 days.

(21) Appl. No.: 17/283,918

(22) PCT Filed: Oct. 9, 2019

(86) PCT No.: PCT/EP2019/077407
§ 371 (c)(1),
(2) Date: Apr. 8, 2021

(87) PCT Pub. No.: WO2020/074608
PCT Pub. Date: Apr. 16, 2020

(65) Prior Publication Data
US 2021/0347134 A1    Nov. 11, 2021

(30) Foreign Application Priority Data
Oct. 9, 2018 (EP) .................................... 18306330

(51) Int. Cl.
*B29D 11/00* (2006.01)
*B24B 13/005* (2006.01)
(Continued)

(52) U.S. Cl.
CPC .... *B29D 11/00317* (2013.01); *B24B 13/0057* (2013.01); *B29C 63/02* (2013.01);
(Continued)

(58) Field of Classification Search
CPC ........ B29D 11/00317; B29D 11/00432; B29D 11/0073; B24B 13/0057; B29C 63/02
See application file for complete search history.

(56) References Cited

U.S. PATENT DOCUMENTS

| 4,959,118 A | 9/1990 | Herbin et al. |
| 5,343,657 A | 9/1994 | Ohlin, Jr. |
| (Continued) | | |

FOREIGN PATENT DOCUMENTS

| CA | 2835801 | * | 1/2019 |
| WO | 99/54118 | | 10/1999 |

OTHER PUBLICATIONS

International Search Report for PCT/EP2019/077407 dated Mar. 9, 2020, 7 pages.
(Continued)

*Primary Examiner* — Mathieu D Vargot
(74) *Attorney, Agent, or Firm* — NIXON & VANDERHYE

(57) ABSTRACT

Disclosed is a method for manufacturing an optical lens including the following successive steps: a step of providing an optical lens attached to a blocking piece; a step of laminating a functional film on a surface of the optical lens; a step of obtaining an assembly constituted by the blocking piece, the optical lens and the functional laminated film; a step of cutting the excess film directly on the assembly, so as to reduce the film shape; and a step of deblocking the optical lens with the film, and the blocking piece.

11 Claims, 3 Drawing Sheets

(51) Int. Cl.
*B29C 63/02* (2006.01)
*B29L 11/00* (2006.01)

(52) U.S. Cl.
CPC .... *B29D 11/00432* (2013.01); *B29D 11/0073* (2013.01); *B29C 2793/009* (2013.01); *B29L 2011/0016* (2013.01)

(56) References Cited

U.S. PATENT DOCUMENTS

| | | |
|---|---|---|
| 5,451,281 A | 9/1995 | Lipman |
| 2005/0126694 A1 | 6/2005 | Yamamoto |
| 2010/0006219 A1 | 1/2010 | Baranton et al. |
| 2013/0095733 A1* | 4/2013 | Lemaire ............... B24B 9/148 451/54 |
| 2014/0333891 A1 | 11/2014 | Boffey |
| 2016/0003986 A1 | 1/2016 | Breme et al. |

OTHER PUBLICATIONS

Written Opinion of the ISA for PCT/EP2019/077407 dated Mar. 9, 2020, 10 pages.
Extended European Search Report for EP 18 30 6330 dated Jul. 30, 2019, 11 pages.

\* cited by examiner

METHOD FOR MANUFACTURING AN OPTICAL ELEMENT WITH A FUNCTIONAL FILM

CROSS-REFERENCE TO RELATED APPLICATIONS

This application is the U.S. national phase of International Application No. PCT/EP2019/077407 filed Oct. 9, 2019 which designated the U.S. and claims priority to EP 18306330.4 filed Oct. 9, 2018, the entire contents of each of which are hereby incorporated by reference.

BACKGROUND OF THE INVENTION

Field of the Invention

The invention relates to a method for manufacturing an optical element with a functional film.

Description of the Related Art

Generally, such an optical element is manufactured by a lamination technique consisting in thermoforming a functional film before depositing it under pressure on an optical element surface which is already attached to a blocking piece. As an example, the functional film may be an anti-reflective coating.
However, it has been observed that in some cases, when comes the step of separating the optical element with the film from the blocking piece, there is an important risk of film delamination, namely a detachment of the film from the optical element. Such a situation is unacceptable, because the lamination step must be restarted, resulting in additional costs.

A method pursuant to the invention allows the optical element with the film to be satisfactory manufactured by eliminating the risk of a film delamination during the step of separating the optical element with the film from the blocking piece.

SUMMARY OF THE INVENTION

In order to solve this problem, the inventors have observed the laminated optical elements before and after the step of separating the optical element with the film from the blocking piece. The inventors observed that after the lamination step, in some cases, the film which adheres to said optical element surface is larger in some dimension than the machined optical element.

It has been observed that when comes the step of separating the optical element with the film from the blocking piece, if parts of the film extend up to or beyond the edges of the optical element, there is an important risk of film delamination, namely a detachment of the film from the optical element. And this happens especially in the cases where the film is laminated on a concave surface of the optical element.

One object of the invention is a method for manufacturing an optical lens and comprising the following successive steps:
  a step of providing an optical lens attached to a blocking piece,
  a step of laminating a functional film on a surface of said optical lens,
  a step of obtaining an assembly constituted by the blocking piece, the optical lens and the functional laminated film,
  a step of cutting the excess film directly on said assembly, so as to reduce the film shape,
  a step of deblocking the optical lens with the film, and the blocking piece.

The originality of a method pursuant to the invention consists in including a step of reducing the film shape prior to the deblocking step, in order to prevent any delamination phenomenon of the film adhering to the optical element. Indeed, the deblocking step is generally achieved by means of a pressurized fluid jet, and if the film protrudes from the lens in some radial directions, said fluid jet may dissociate the functional film from the optical element before the end of the deblocking step. By cutting the film in excess, this one will stay in the same position on the optical element with a homogeneous contact against a surface of said element. Consequently, with the beforehand cutting step, the deblocking step will not have any negative influence on the functional film or adhesion layer and its position on the optical element, and the resulting piece comprising the optical element and said film will have the required quality.

It is to be noted that by laminated a film on a lens the disclosure means the act of providing a film on one side, and a lens on the other side and affixing the film onto a surface of the lens, using an adhesive binder layer between the film and said surface.

According to the disclosure, the step of cutting the excess film happens while the optical lens is still fixed onto the blocking piece.

The blocking piece in the disclosure is fixed to the lens prior to introducing the lens and blocking piece into a lamination machine configured for laminating the functional film onto the lens. After the laminating step, the film is fixed onto the lens, the lens is fixed onto the blocking piece and the blocking piece may be removed from the lamination machine in order to remove the lens from said lamination machine.

A blocking piece according to the disclosure is an element that is fixed with a part of the surface of the lens opposite the surface to be laminated. The blocking piece may comprise a blocker and a binding material to bind the blocker to the lens surface. The blocker is configured for cooperating at least with the laminating machine and configured to be removed from the laminating machine. The blocker may optionally be a surfacing blocker, configured for cooperating with a surfacing machine which enable to form the lens from a semi-finished lens in a surfacing machine. The binder may be a metal alloy with a low-temperature fusion point or an adhesive.

The functional film aims to improve the optical properties of the optical element in particular by providing it with added features such as a hard coat, an anti-reflective coating or a polarizing film, anti-shock properties, a tint, a mirror or a filter for specific wavelength, anti-smudge, anti-fog or antistatic properties, self-healing or self-cleaning properties, etc. The optical lens may have a curved profile including a concave surface, a convex surface or may have a planar profile. The blocking piece acts as a support for the optical element in order to maintain said optical lens in a fixed position during the laminating step. Once said laminating step is completed it is possible to retrieve an assembly constituted by the blocking piece, the optical lens and the functional laminated film, said three elements being fixed to each other. The step of cutting the film may be achieved with any means capable of reducing the film size, for example a laser beam or a blade. The film shape reduction may be achieved homogeneously, for example in a symmetric manner, or only in particular directions where some parts of the film extend from the optical lens edge.

According to a possible characteristic, the step of cutting the film excess allows that the entire film surface is completely adhered on the lens surface, without any part of the film which overhangs the edge of the lens and that could create a drag for a pressurized fluid jet during the deblocking step. The aim of cutting the film is to maintain the dimensions of the film less or equal to the surface of the optical lens against which said film will be applied.

According to a possible characteristic, the step of cutting the excess film is determined so as to obtain a minimum radial distance in a plan view between the film edge and the laminated lens surface edge which is between 0.05 mm and 10 mm, preferably between 0.5 mm and 5 mm, for example between 1 mm and 3 mm with the film edge being closer to a center of the lens than the laminated lens surface edge Said otherwise, the step of cutting the excess film may be such that the film is cut smaller than the edges of the laminated lens surface. It is important to not reduce too much the film size, because said functional film must be approximately applied on the whole surface of the optical element after a future edging step used to machine the optical element to a contour adapted to fit in a predetermined frame of spectacles.

According to this embodiment of the disclosure, the step of cutting the excess film is determined so as to obtain a minimum radial distance in a plan view between the film edge and the laminated lens surface edge which is between 0.05 mm and 10 mm, preferably between 0.5 mm and 5 mm, for example between 1 mm and 3 mm with the film edge being closer to a center of the lens than the laminated lens surface edge. Said otherwise, the film edge forms a closed loop which is inside a closed loop formed by the laminated lens surface edge.

According to a possible characteristic, the step of cutting the excess film is carried out with one cutting element to be chosen among a sharp edge, a laser cutter, and a blade. These examples are illustrative and are not limitative. These three cutting elements are particularly suitable for cutting a film which has been beforehand deposited on the optical element by a lamination technique.

According to a possible characteristic, the method further comprises the following steps:
  a step of providing an assembly support,
  a step of placing the assembly in said assembly support, so that the film constitutes the upper part of said assembly,
  a step of providing an arm equipped with a cutting element in a fixed position relatively to a center of the assembly support, at least one element to be chosen among the arm and the assembly support being adapted to rotate around a central axis of the assembly support,
  a step of rotating the at least one element relative to the central axis of the assembly support so as to allow the cutting element to cut the excess film.

In order to operate the cutting step in optimized conditions, it is important to maintain the assembly constituted by the optical element with the film and the blocking piece, in the same fixed position during this step, particularly to improve the accuracy of the cut. The cutting step may be carried out indifferently with a fixed cutting means and a rotary assembly support, or with a fixed assembly support and moving cutting means. What is very important in the framework of a method pursuant to the invention, is that there is a relative movement between the cutting element and the assembly support, so that this cutting element move around the film at a predetermined distance from the center of the assembly support.

According to a possible characteristic, the functional laminated film comprises a main film made of Cellulose Triacetate (TAC), polyethylene terephthalate (PET), polycarbonate (PC), Polyvinyl Alcohol (PVA), or Cyclic Olefin Copolymer (COC). Films with such compositions can be easily and accurately cut, to have the suitable form and size with respect to the optical lens on which the film is deposited.

According to a possible characteristic, the functional laminated film provides at least one feature to the lens to be chosen among a hard coat, an anti-reflective coating or a polarizing film, anti-shock properties, a tint, a mirror or a filter for specific wavelength, anti-smudge, anti-fog or anti-static properties, self-healing or self-cleaning properties, alone or in combination. These examples are only illustrative and are not limitative. In a general manner, the functional film may have a function of protecting the optical lens surface, or a function intended to improve the optical properties of said optical lens. The film may also have these two functions.

According to a possible characteristic, the optical lens with the film is fastened to the blocking piece by means of a bonding material, and wherein the deblocking step is carried out with at least a pressurized fluid jet intended to separate the lens with the film from the bonding material. If some parts of the film extend beyond the optical element and overhang the edges of said optical element, the pressurized fluid jet may separate said film from the optical element, and thus the optical lens is defective and must be replaced.

Another object of the invention is an apparatus for achieving the cutting step of a method pursuant to the invention.

According to the invention, the apparatus comprises an assembly support intended for receiving an assembly comprising the optical lens with the functional laminated film and the blocking piece, and a cutting element adapted to cut an excess film present on said assembly and having a surface that spread out of said optical lens, and thus having some parts overhanging over the optical lens. This apparatus schematically comprises a support intended to receive an assembly constituted by the optical lens with the laminated film and the blocking piece, and a cutting element adapted to cut an excess film present on this assembly. This apparatus can be used manually, or automatically with a motor intended to activate the cutting element and/or to generate a movement of said cutting element relative to the assembly support or the contrary (a movement of the assembly support relative to the cutting element).

According to a possible characteristic, the cutting element is one of a sharp edge, a laser cutter, and a blade. These examples are only illustrative and are not limitative. These three cutting elements are particularly suitable for cutting a film which has been beforehand laminated on the optical element.

According to a possible characteristic, the apparatus further comprises an arm equipped with a cutting element, said arm being placed relatively to the assembly support so that the cutting element is placed over the film edge at a predetermined distance from the assembly support center. This predetermined position can be calculated or measured. Once the predetermined position is known it becomes easy to position the arm in the suitable position so as to place the cutting element close to the edge of the optical lens, where it is suitable to cut the film. The predetermined distance may result from measurements and/or calculations. This predetermined distance leads to position the cutting element at a precise radial distance from the optical lens edge to ensure a clean cut of the film.

According to a possible characteristic, at least one element to be chosen among the assembly support and the arm equipped with the cutting element, is adapted to rotate about a central axis of the assembly support. Once the predetermined distance has been assessed, the cutting step can be easily achieved by a simple rotation of the arm or of the assembly support to obtain a clean cut of the functional laminated film.

According to a possible characteristic, the assembly support is cylindrical-shaped and is designed to rotate about its revolution axis which extends in a vertical direction, and the arm extends in a horizontal direction.

According to a possible characteristic, the arm is placed above the film and the cutting element acts in a vertical direction.

According to a possible characteristic, the position of the arm is adjustable to adapt the cutting element position to the film sizes, so that said cutting element is placed above the film edge at a predetermined radial distance from the optical lens edge, and preferably over the surface of the optical lens.

According to a possible characteristic, the position of the arm is adjustable to adapt the cutting element position to the contour of the optical lens, so that said cutting element is placed above the film edge at a predetermined radial distance from the optical lens edge, and preferably over the surface of the optical lens. Said position, with regard to the center of the optical lens, may thus vary depending on the shape of the lens contour. Said position may for example be adjusted by having had a prior reading of the contour of the optical lens edge, or by having the position of the arm be adjusted with regard to the feedback of a sensor positioned so as to acquire a position of the edge of the lens near the position of the cutting element.

A method pursuant to the invention presents the advantage to be conducted continuously, without any risk of delamination of the film during the deblocking step. Moreover, while it includes a supplemental step consisting in cutting the excess film which overhang the edge of the optical lens, said step is achieved with an apparatus which is easy and rapid to handle and which produces a clean cut of the film.

BRIEF DESCRIPTION OF THE DRAWINGS

We give hereafter a detailed description of a preferred embodiment of a method pursuant to the invention, by referring to the following figures.

DESCRIPTION OF THE PREFERRED EMBODIMENTS

Figure 1:
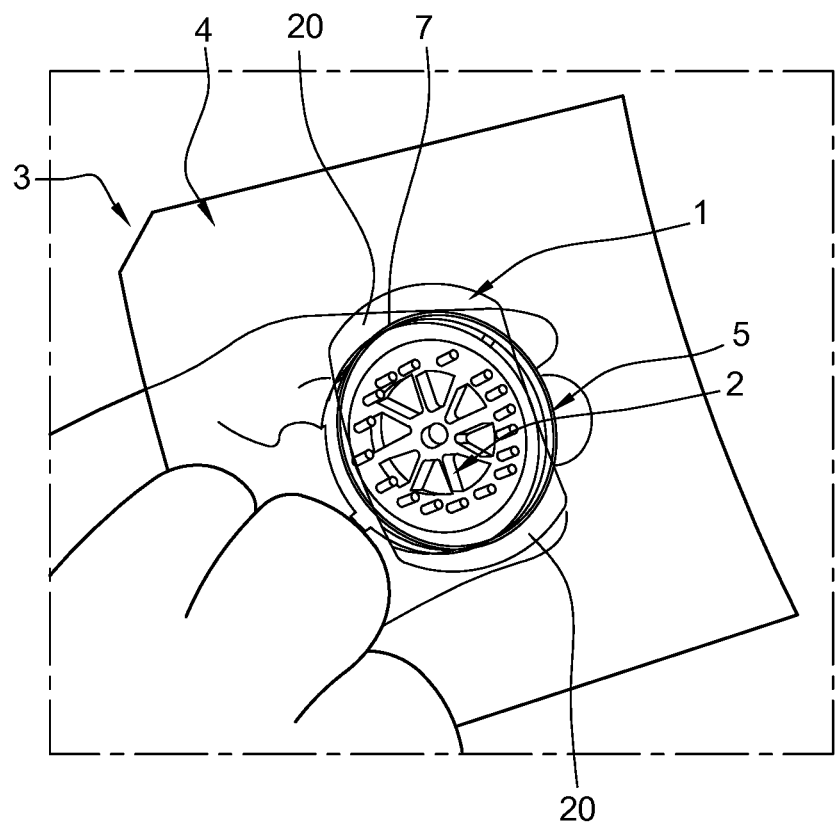
FIG. 1 is a perspective view of a first assembly constituted by a blocking piece, an optical element with a functional film and a carrier.

Referring to FIG. 1, when a lamination method is used to deposit a functional film 1 on an optical element which is generally constituted by an optical lens 2, a final first assembly 3 comprising said optical lens 2 with said film 1, a carrier 4 and a blocking piece 5 is obtained. To sum up a lamination method, a multilayers assembly comprising the functional film 1, the carrier 4 and different layers placed therebetween, is beforehand thermoformed in order to adapt the form of the functional film 1 to the surface of the optical lens 2 intended to receive said functional film 1.

Then, this multilayers assembly is laminated on the surface of the optical lens 2, and once said multilayers assembly has been deposited on said optical lens 2, we obtain the first assembly 3 showed in FIG. 1.

It is important to point out that the functional laminated film 1 provides at least one feature to the optical lens 2 to be chosen among a hard coat, an anti-reflective coating or a polarizing film, anti-shock properties, a tint, a mirror or a filter for specific wavelength, self-healing or self-cleaning properties, a surface modifier having anti-smudge, anti-fog or antistatic properties, alone or in combination. In a more general manner, such a functional film has a protection function in regard to the optical lens 2 on which it is deposited, or a supplemental optical function intended to improve the optical properties and/or characteristics of the optical lens 2. The functions of said functional film 1 are thus non-limited to the examples listed before, which are only illustrative and not limitative.

The functional laminated film 1 comprises a main film made of Cellulose Triacetate (TAC), polyethylene terephthalate (PET), polycarbonate (PC), Polyvinyl Alcohol (PVA), or Cyclic Olefin Copolymer (COC). These are only illustrative examples which are not limitative in the framework of a method pursuant to the invention.

The blocking piece 5 acts as a receptacle to receive the optical lens 2 just before the film lamination step occurs. Such a blocking piece 5 is designed to maintain the optical lens 2 in a stable manner before the film lamination step is achieved. On that subject the optical lens 2 is fixed in the blocking piece 5 by means of an adhesive material.

Figure 2:
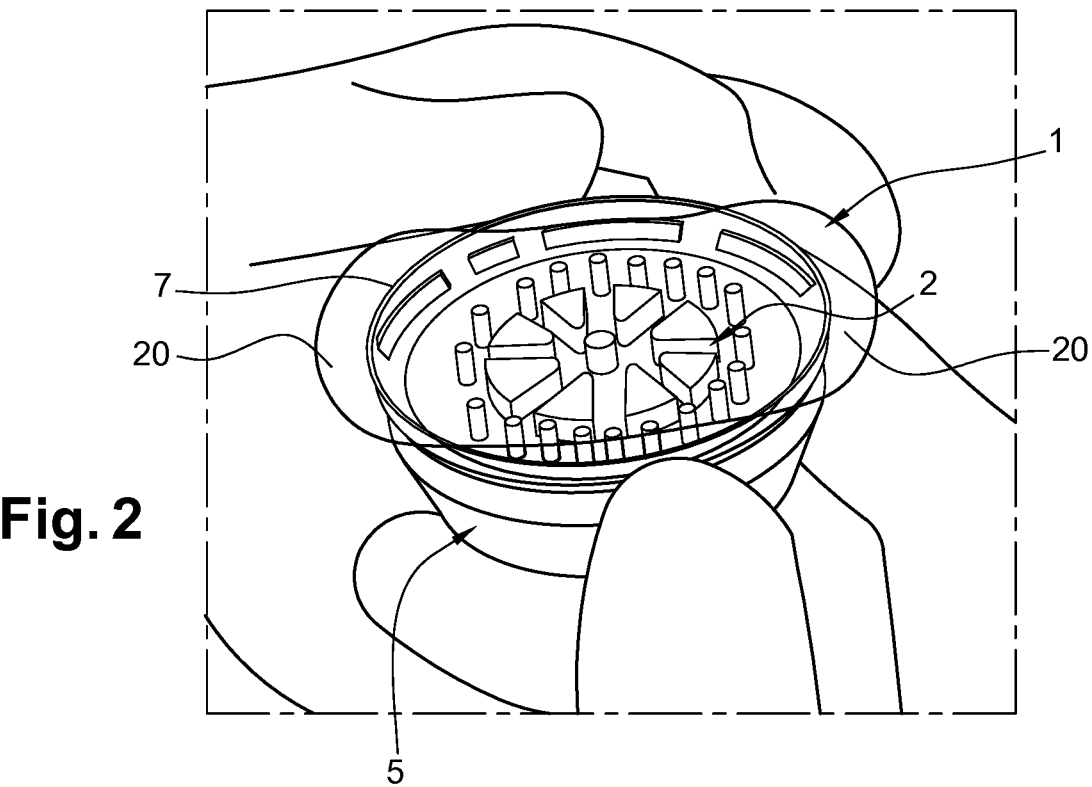
FIG. 2 is a perspective view of a second assembly which corresponds to the first assembly of FIG. 1 without the carrier.

Referring to FIG. 2, once the first assembly 3 has been formed after the film lamination step, the carrier 4 which is a rigid and transparent plastic film is manually removed from the first assembly 3. We finally obtain a second assembly 6 made of the optical lens 2 with the functional laminated film 1 and the blocking piece 5, said second assembly constituting an independent resulting piece which can be easily handled and/or transported to finally obtain the suitable optical lens 2 with a functional film 1 having a homogeneous adherence on said optical lens 2, and having the required size with respect to the lens 2 dimensions.

In the example showed in the different figures, it is supposed that the optical lens 2 and the blocking piece 5 have a circular contour and each have a symmetry of revolution.

Figure 4:
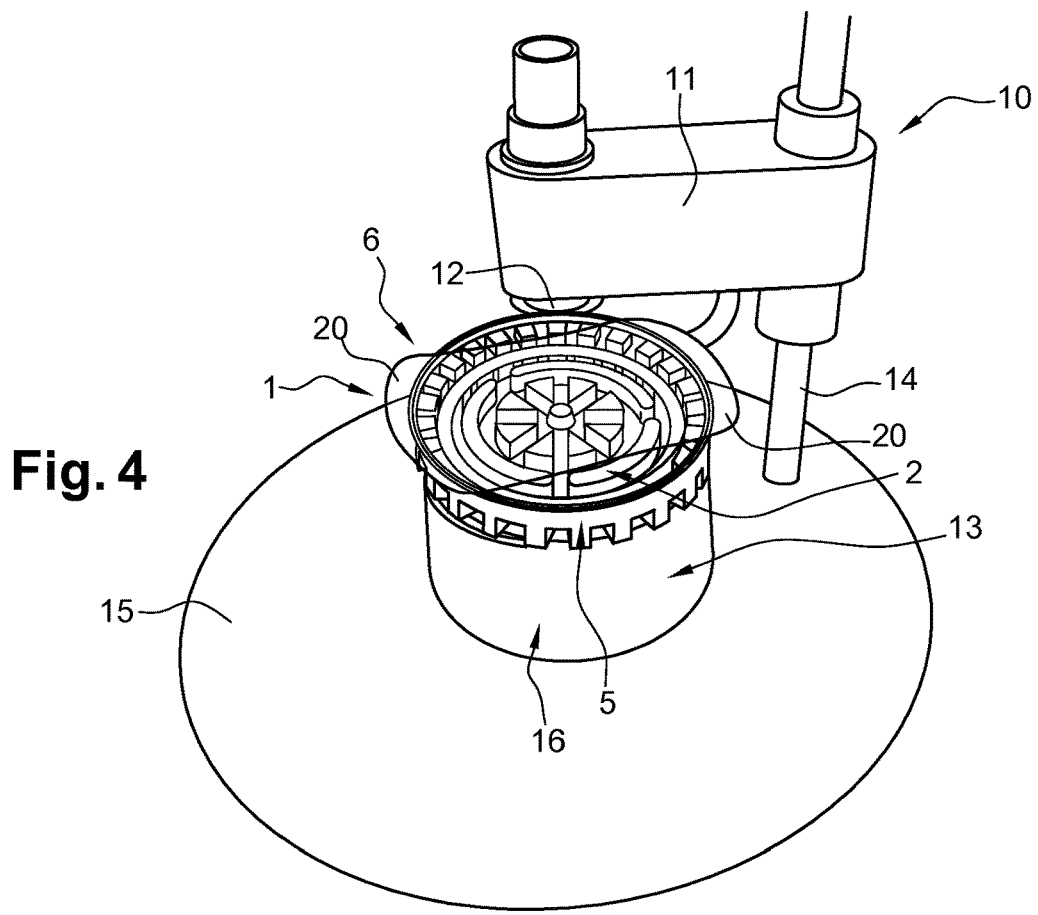
FIG. 4 is a perspective view of an apparatus pursuant to the invention and intended to cut the excess film which overhang the optical lens.

Referring to FIGS. 2 and 4, it can therefore happen that some parts 20 of the functional film 1 extend beyond the circular edge 7 of the optical lens 2 so that they overhang over said edge.

An inventory of film patches with varying dimensions can be maintained. However, such an inventory increases complexity and cost in manufacturing. Further, while it should be possible, even if more expensive, to plan an inventory of film patches when the overhang of the film is due to choosing, prior to the surfacing step a semi-finished lens with a diameter smaller than a larger dimension of the film, such is not always the case.

However, during the manufacturing of some type of lenses, the surfacing step happens to reduce the diameter of the optical lens as compared to the initial dimension of the semi-finished lens. Such reduction of diameter may lead to the maximum dimension of the film being larger than the surfaced lens diameter, or more precisely having part of the film overhanging above the surface lens edge, when the film is oriented and centered with the optical center of the lens.

The final diameter after such reduction of diameter during the surfacing step depends on the prescription desired for the optical lens, ie the optical power. Accordingly, a multiplicity of such diameters may be produced. Further such reduction of diameter may lead to lens contour that do not have symmetry of revolution anymore. Accordingly, in such cases, if one desire films that mostly cover most of the surface of the lens, at least in one dimension, but do not have any overhang, the construction of an inventory of films patches of various dimensions becomes highly complicated.

Such a configuration, involving a functional film 1 which extends in any direction beyond the optical lens edge 7, is not acceptable, because it may negatively influence the deblocking step which enable to separate the optical lens 2 with the film 1 from the blocking piece 5. Indeed, said separating step is generally achieved by means of pressurized fluid jet and thus, it is possible and even probable, that said pressurized fluid jet generates a film delamination which can lead to a film 2 removal. Consequently, the film lamination step must be restarted, greatly increasing the optical lens manufacturing costs.

In order to prevent delamination, a method of manufacturing an optical lens 2 pursuant to the invention, comprises a step of cutting the film 1 excess 20, directly on the second assembly 6 obtained.

Figure 3:
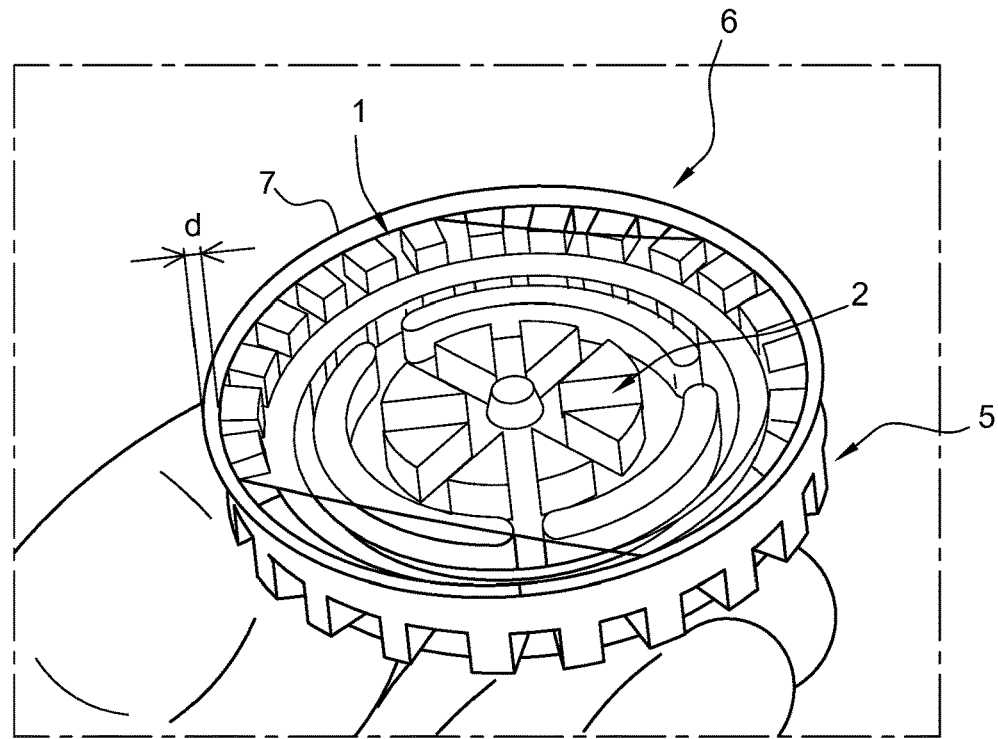
FIG. 3 is a perspective view of the second assembly of the FIG. 2 after a cutting step of the functional film.

Referring to FIG. 3, the aim of this cutting step is to limit the film size so that the film dimensions be completely included in the optical lens dimensions. In other words, the film size is to be equal or less than the size of the optical lens 2. Advantageously, this cutting step allows obtaining a minimum radial distance d in a plan view between the film 1 edge and the laminated lens surface edge which is comprised between 0.05 mm and 10 mm, preferably comprised between 0.1 mm and 5 mm, for example between 0.5 mm and 3 mm with the film edge being closer to a center of the lens than the laminated lens surface edge.

Such a configuration enables a smoother deblocking. Indeed, during the further deblocking step, which is configured to separate the lens from the blocking piece, stress is applied on the film, the lens and the blocker. In particular, the separating step may be achieved by means of pressurized fluid jet. Due to cutting the film so that the film edge is closer to a center of the lens than the laminated lens surface edge, the edges of the film provide less drag to the pressurized fluid jet. This is even truer when the laminated lens surface is concave. In such case if the edge of the film is closer to the center of the lens than the edge of the lens, the edge of the film are protected from the pressurized fluid jet by the edges of the lens. Indeed, the edges of the film are inside the concavity formed by the concave laminated lens surface.

Figure 5:
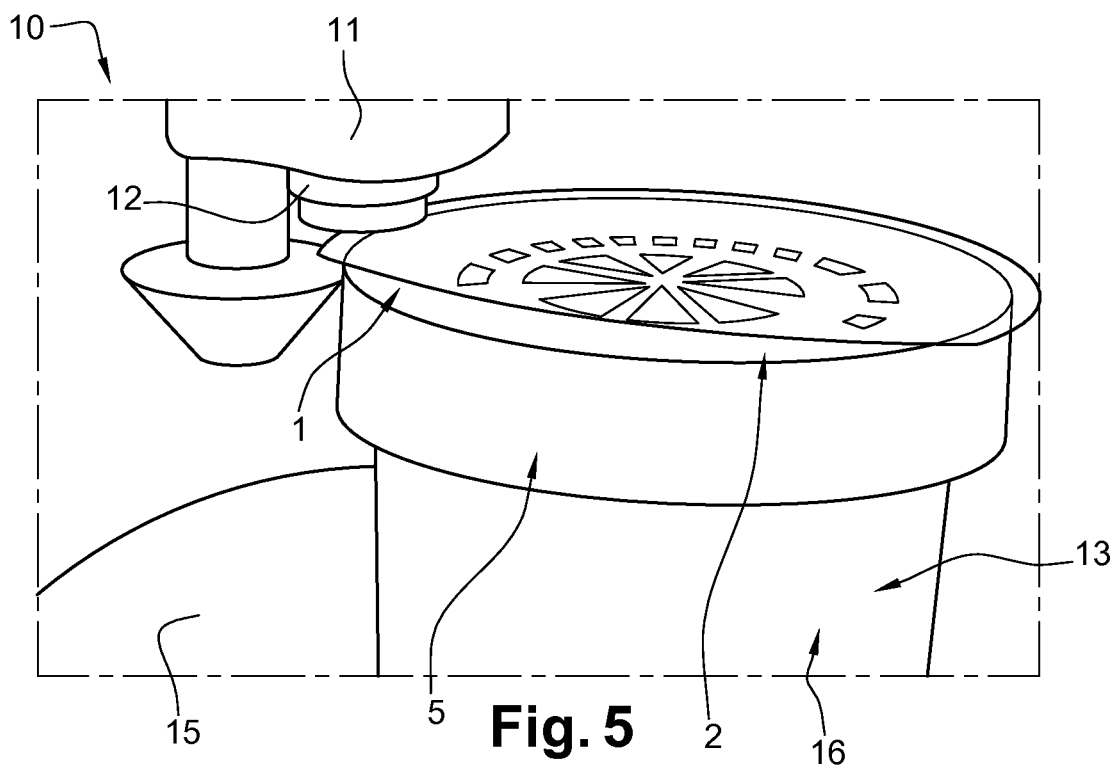
FIG. 5 is a perspective view of a specific area of the apparatus of FIG. 4 and showing an interaction between a cutting element of said apparatus and the film deposited on an optical lens.
Figure 6:
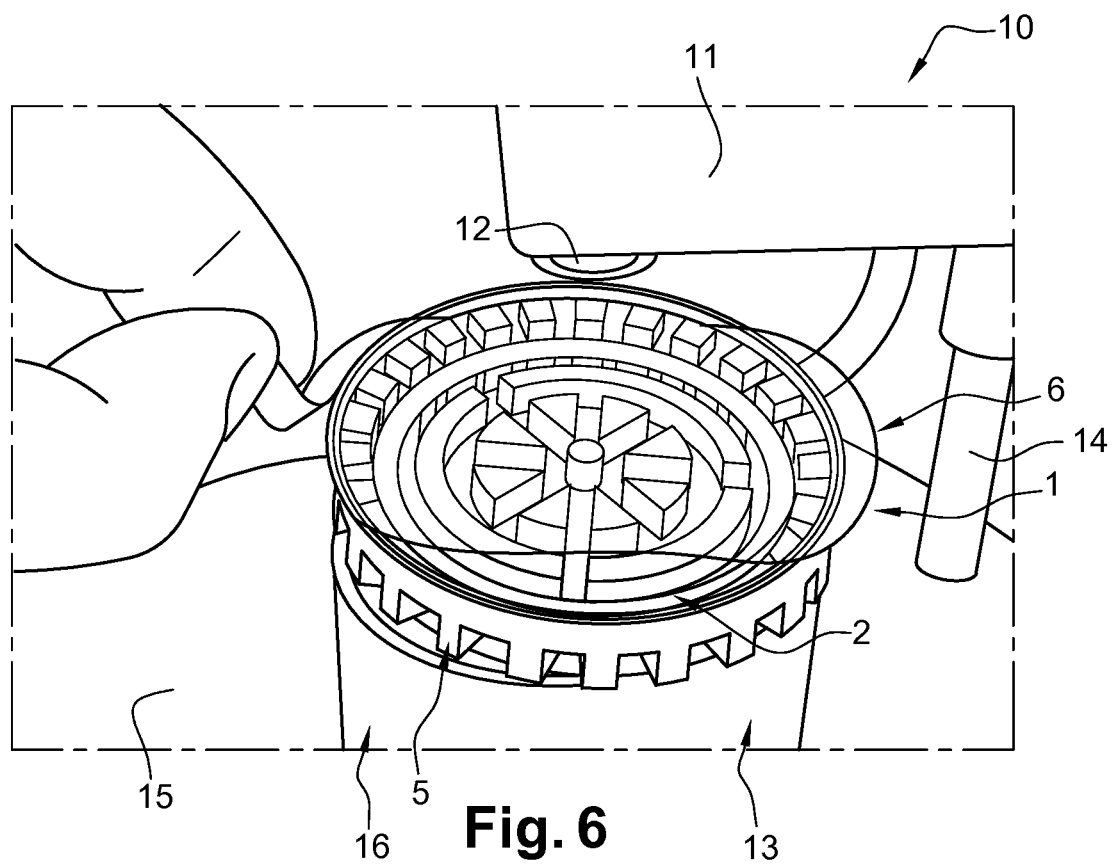
FIG. 6 is a perspective view of a specific area of the apparatus of FIG. 4 and showing a step of withdrawal manually the functional film excess on the optical element after having been cut.

Referring to FIGS. 4, 5 and 6, the cutting step is carried out with an apparatus 10 comprising an arm 11 equipped with a cutting element 12, and an assembly support 13 intended to receive the second assembly 6. The cutting element 12 may for example be chosen among a sharp edge, a laser cutter, and a blade. In a general manner, any type of cutting means works, if it is capable of cleanly cutting the functional film 1 with a certain accuracy. The arm 11 extends in a horizontal direction and have a first extremity which is linked to a vertical cylindrical rod 14 and a second extremity where the cutting element 12 is placed. Preferably, the arm distance from a center of the assembly support 13 is adjustable so as to adapt the arm position, or dimension, to a specific optical lens 2 size. The assembly support 13 is cylindrical-shaped and is positioned on a cylindrical platform 15 of the apparatus 10, so that its axis of revolution extends in a vertical direction perpendicularly to the platform surface 15. This assembly support 13 is delimited by a circular bottom and by a cylindrical lateral wall 16 and is rotatably mounted on the platform 15 about its axis of revolution. The assembly support 13 may be rotated, either manually, or automatically by means of a motor and a control device. When the assembly support 13 is handled manually by an operator, said operator can adjust the rotation direction in function of his need. In this configuration, it is supposed that the assembly support 13 is freely mounted in rotation in the two possible directions of rotation about its revolution axis. In a same way, when a motor makes rotated the assembly support 13, said motor is designed to allow a rotation movement of the assembly support 13 in the two possible directions of rotation about its revolution axis. An electrical motor is particularly suitable to perform such assembly support 13 rotary movements.

Referring to FIG. 4, the second assembly 6 is placed inside the assembly support 13 so that the optical lens 2 and the functional film 13 protrude above said assembly support 13, the functional film 1 corresponding to the upper part of said second assembly 6. In this configuration, the functional film 1 extend in a plan which is approximately horizontal (the term "approximately" is used because the functional film is not rigorously plan).

Referring to FIG. 5, the arm is then positioned with respect to the vertical rod, and its position or length is eventually adjusted so as to lead the cutting element 12 above the functional film 1 at a given radial distance "d" from the peripheral edge of the optical lens 2, inside said optical lens 2. Preferably, the cutting element 12 is then above the lens surface so as to have a radial distance "d" which is directed toward the center of the lens, and having a part of the surface of the optical lens uncovered from the film on the whole contour of the optical lens. A sensor/feeler enables to automatically adapt the position of the cutting element 12 to the position of the edge of the optical lens.

The cutting element 12 is then activated to contact the functional film 1 and to begin the cutting step. In order to cut the suitable portions of the functional laminated film 20 which extend beyond the optical lens edge, the assembly support 13 is rotated, manually or automatically with a motor.

Referring to FIG. 6, once the functional film parts 20 overhanging the optical lens 2 edge 7 have been cut, they have then removed manually from the rest of the functional film 1 which adheres homogeneously and firmly to the optical lens 2. This operation may be simply carried out with two fingers of the hand.

When the laminated functional film sizes have been reduced by the cutting step, the deblocking step can begin to separate the optical lens 2 with the film 1 and the blocking piece 5 without any risk of film delamination, because the film 1 is completely included in the optical lens 2 without any part which extends beyond the optical lens edge 7.

The invention claimed is:

1. A method for manufacturing an optical lens, the method comprising the following successive steps:
    a step of providing an optical lens attached to a blocking piece at a convex surface of the optical lens, the blocking piece acting as a receptacle to receive the optical lens;
    a step of laminating a functional film on a concave surface of said optical lens opposite the convex surface to obtain a laminated lens surface;
    a step of obtaining an assembly constituted by the blocking piece, the optical lens and the functional laminated film, the optical lens with the functional laminated film being fastened to the blocking piece by a bonding material;
    a step of cutting a film excess directly on said assembly to reduce the film shape, the film excess comprising parts of the functional laminated film which extend beyond an edge of the optical lens and thus overhang the edge; and
    a step of deblocking the optical lens with the functional laminated film, and the blocking piece, the deblocking step being carried out with at least a pressurized fluid jet configured to separate the optical lens with the functional laminated film from the bonding material.

2. The method according to claim 1, wherein the step of cutting the film excess allows that the entire film surface is completely adhered on the laminated lens surface, without any part of the film which overhangs the edge of the lens.

3. The method according to claim 2, wherein the step of cutting the film excess is determined to obtain a minimum radial distance in a plan view between an edge of the cut film and an edge of the laminated lens surface, the minimum radial distance being between 0.05 mm and 10 mm, the cut film edge being closer to a center of the lens than the laminated lens surface edge.

4. The method according to claim 1, wherein the step of cutting the film excess is carried out with one cutting element chosen from a sharp edge and a laser cutter.

5. The method according to claim 1, further comprising the following steps:
    a step of providing an assembly support;
    a step of placing the assembly in said assembly support, so that the film constitutes the upper part of said assembly;
    a step of providing an arm equipped with a cutting element in a fixed position relatively to a center of the assembly support, at least one element to be chosen from the arm and the assembly support being configured to rotate around a central axis of the assembly support; and
    a step of rotating the at least one element relative to the central axis of the assembly support to allow the cutting element to cut the film excess.

6. The method according to claim 1, wherein the functional laminated film comprises a main film made of one of cellulose triacetate (TAC), polyethylene terephthalate (PET), polycarbonate (PC), polyvinyl alcohol (PVA), and cyclic olefin copolymer (COC).

7. The method according to claim 1, wherein the functional laminated film provides at least one feature to the lens chosen from one or more of a hard coat, an anti-reflective coating, a polarizing film, anti-shock properties, a tint, a mirror, a filter for specific wavelength, anti-smudge, anti-fog or antistatic properties, and self-healing or self-cleaning properties.

8. The method according to claim 2, wherein the step cutting the film excess is determined to obtain a minimum radial distance in a plan view between an edge of the cut film and an edge of the laminated lens surface, the minimum radial distance being between 0.05 mm and 5 mm, the cut film edge being closer to a center of the lens than the laminated lens surface edge.

9. The method according to claim 2, wherein the step of cutting the film excess is determined to obtain a minimum radial distance in a plan view between an edge of the cut film and an edge of the laminated lens surface, the minimum radial distance being between 1 mm and 3 mm, the cut film edge being closer to a center of the lens than the laminated lens surface edge.

10. The method according to claim 2, wherein the step of cutting the film excess is carried out with one cutting element chosen from a sharp edge and a laser cutter.

11. The method according to claim 3, wherein the step of cutting the film excess is carried out with one cutting element chosen from a sharp edge and a laser cutter.

* * * * *